United States Patent [19]

McAtamney

[11] Patent Number: 5,398,973
[45] Date of Patent: Mar. 21, 1995

[54] DOUBLE CONTAINMENT PIPE SUPPORT RETAINER

[75] Inventor: Dennis E. McAtamney, Columbus, Mich.

[73] Assignee: Nibco Inc., Elkhart, Ind.

[21] Appl. No.: 213,122

[22] Filed: Mar. 14, 1994

[51] Int. Cl.⁶ ............................................. F16L 35/00
[52] U.S. Cl. ........................................ 285/3; 285/45; 285/138; 285/423; 285/915
[58] Field of Search ..................... 285/138, 133.1, 45, 285/423, 915, 3

[56] References Cited

U.S. PATENT DOCUMENTS

| 2,695,182 | 11/1954 | Folz | 285/138 |
| 4,886,305 | 12/1989 | Martin | 85/133.1 |
| 5,018,260 | 5/1991 | Ziu | 138/111 |
| 5,186,502 | 2/1993 | Martin | 285/133.1 |

FOREIGN PATENT DOCUMENTS

| 544133 | 7/1957 | Canada | 285/133.1 |
| 709051 | 8/1931 | France | 285/133.1 |
| 1434870 | 5/1976 | United Kingdom | 285/133.1 |

Primary Examiner—Dave W. Arola
Attorney, Agent, or Firm—Price, Heneveld, Cooper, DeWitt & Litton

[57] ABSTRACT

A containment pipe fitting subassembly of a containment fitting, having open end sockets of a radius to slidingly receive ends of containment pipes, a carrier fitting having open end sockets of a radius to slidingly receive ends of carrier pipes, the carrier fitting being inside the containment fitting, a pair of alignment supports between respective ones of the containment fitting sockets and the carrier fitting sockets, each support having a peripheral flange with a radius comparable in size to the radius of said containment fitting socket and fitted therewithin, the flange defining a central orifice having a diameter comparable in size to the inner diameter of the carrier fitting socket, and each support also having an axially extending cylindrical sleeve with an inner diameter comparable in size to the outer diameter of the carrier socket and fitted over and adhesively tacked to the carrier socket. Carrier pipes are inserted into and bonded to the carrier fitting sockets. Containment pipes are inserted into and bonded to the containment fitting sockets.

9 Claims, 1 Drawing Sheet

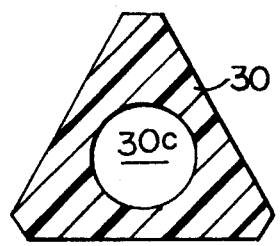
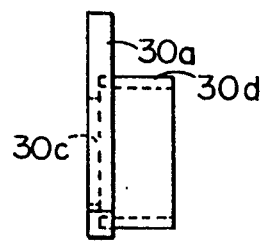
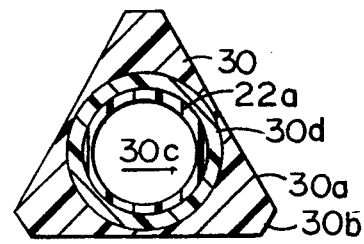
FIG. 4     FIG. 3     FIG. 2
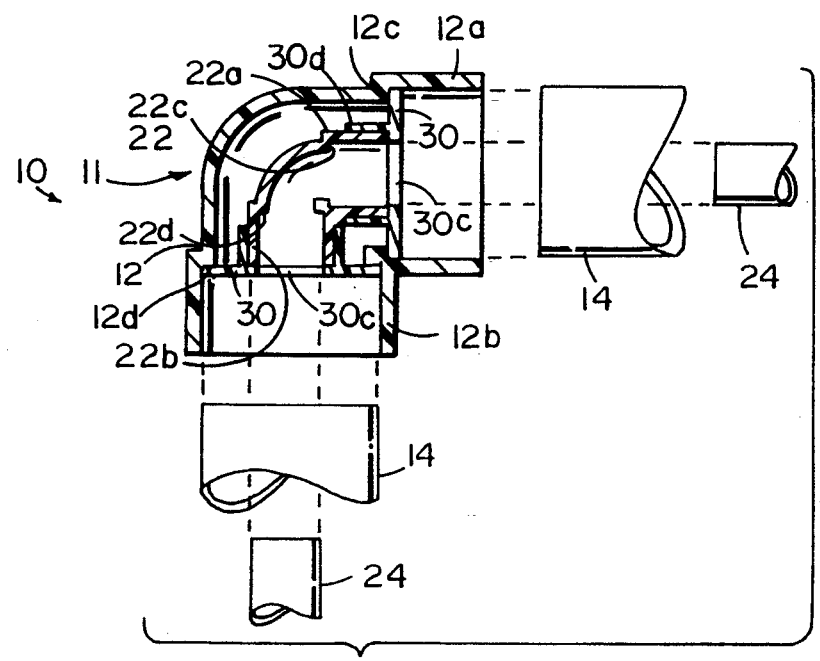
FIG. 1
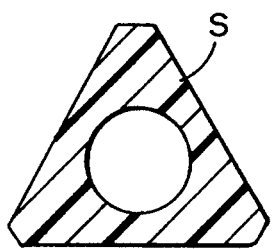
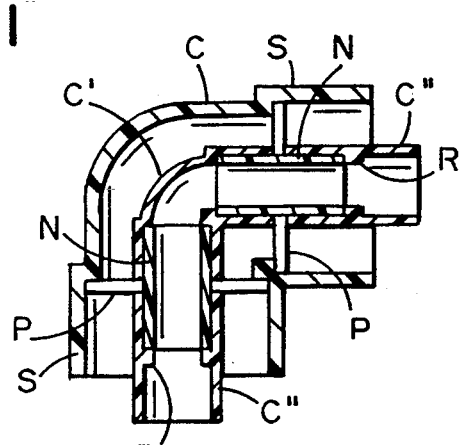
FIG. 6 PRIOR ART     FIG. 7 PRIOR ART     FIG. 5 PRIOR ART

DOUBLE CONTAINMENT PIPE SUPPORT RETAINER

BACKGROUND OF THE INVENTION

This invention relates to containment pipe assemblies, and more particularly to a novel support for assembling a carrier pipe fitting and a containment pipe fitting for subsequent assembly thereof with carrier pipes and containment pipes, and to the resulting assembly. Containment piping is now well known as an effective way to prevent leakage pollution. Yet, such a piping system is expensive and laborious to produce and install.

The process of assembling containment pipe assembly elements including carrier pipes, containment pipes, a carrier pipe fitting such as an elbow, and a containment pipe fitting such as an elbow, for example, typically occurs in stages. Specifically, several components of the fitting subassembly are assembled at the supplier and then shipped to the installer who attaches the carrier pipes and the containment pipes at the site. The first step of assembling the fitting subassembly includes careful interengagement of several carrier fitting components while adhering them together, interengagement of several containment fitting components around the carrier fitting components, while adhering; the containment fitting components together, and testing the fitting subassembly for leaks. Subsequently, the fitting subassembly is connected with carrier pipes and containment pipes.

There are significant fitting component costs due to the several components necessary, assembly labor costs, and testing costs. The large number of interfitting surfaces presents a relatively high potential for leakage flaws. If a leak is found, the entire fitting subassembly, with all of its components, is defective.

A further complication of the typical completed piping system arises with stresses created upon the occurrence of thermal expansion of the carrier pipes. If a hot liquid is conveyed, the stresses are large. The intersection of the conventional components in the fitting subassemblies is such that the thermal expansion stresses tend to disrupt the pipe system itself, causing failure and undesired spillage or leakage.

SUMMARY OF THE INVENTION

An object of this invention is to provide a containment pipe assembly employing a unique support which specially interfits between the carrier pipe fitting and the containment pipe fitting to align such, to enable easy assembly of the fitting components, and to enable fewer fitting components to be used. The support has a peripheral flange engageable with the inner diameter of the containment pipe socket, this flange defining a central opening with a diameter the size of the carrier pipe outer diameter and the carrier fitting socket inner diameter, and having an axially extending sleeve with an inner diameter larger than the central opening, and comparable to the outer diameter of the carrier fitting socket.

The support centers the carrier fitting within the containment fitting and enables the carrier pipe to be readily inserted in fully aligned fashion within the containment pipe. The fitting subassembly has fewer components than the prior art. No leak testing is required of the fitting subassembly. It is immediately ready to be supplied to the installer who inserts the carrier pipes and containment pipes.

Another object is to provide a novel, simplified fitting subassembly for a containment pipe system that enables controlled breakaway of the novel support under thermal expansion stresses, without resulting damage to the functional pipe system.

These and other objects, advantages and features will become apparent upon studying the following specification in conjunction with the drawings.

BRIEF DESCRIPTION OF THE DRAWINGS

FIG. 1 is a side elevational, sectional view of a containment pipe fitting subassembly and adjacent pipes employing this invention;

FIG. 2 is a sectional view of the assembly in FIG. 1, without the containment fitting;

FIG. 3 is a side elevational view of the novel support in the assembly of FIG. 1;

FIG. 4 is an end elevational view of the support in FIG. 3;

FIG. 5 is a cross-sectional view of a prior art containment pipe fitting subassembly;

FIG. 6 is an end elevational view of the support plate in FIG. 5; and

FIG. 7 is a side elevational view of the conventional support plate in FIG. 6.

DESCRIPTION OF THE PREFERRED EMBODIMENT

The invention is disclosed in its preferred form in FIGS. 1–4, with prior art being set forth in FIGS. 5–7.

Referring first to the prior art figures, there is shown an elbow-type fitting subassembly including a containment elbow fitting C, a carrier elbow fitting C', a pair of carrier pipe couplings C", a pair of interconnecting nipples N, and a pair of flat spacer plates P. Spacer plates P fit around nipples N and are locked in position between carrier elbow C' and couplings C", as well as against the annular shoulders of the sockets S on the ends of containment elbow C. Couplings C" each include an internal peripheral rib R for engaging the axial outer ends of the nipples N. The components are typically of a polymer material. As will be noted, the subassembly is complex, including a multiple of parts which must be specially manufactured and then assembled. The components are bonded or adhered to each other and ultimately leak tested to determine whether any of the multiple joints of the fitting subassembly are faulty.

Referring now to the novel fitting subassembly in FIG. 1, the containment pipe assembly 10 includes a fitting subassembly 11 as well as a pair of containment pipes 14 and a pair of carrier pipes 24. It will be realized that this exemplary 90° elbow fitting could be any fitting for interconnecting container pipes and carrier pipes. This fitting subassembly 11, here depicted as the 90° elbow subassembly, includes a containment elbow 12 and a carrier elbow 22. The containment elbow 12 has open end sockets 12a and 12b for receiving the ends of containment pipes 14. The inner diameter of sockets 12a and 12b is larger than the central diameter of the elbow, and is comparable in size to the outer diameter of containment pipes 14. Sockets 12a and 12b have inner, annular, axially oriented shoulders 12c and 12d, respectively. Positioned centrally within containment elbow 12 is the smaller carrier elbow 22 which has open end sockets 22a and 22b. Sockets 22a and 22b have annular, inner shoulders 22c and 22d, respectively. The inner diameter of sockets 22a and 22b is larger than the diameter of the flow passage, and comparable in size to the outer diameter of carrier pipes 24. The two fittings are spaced from each other to form a hollow space for collection of any leakage from the carrier pipes.

Positioned radially between the outer end sockets 22a and 22b of carrier elbow fitting 22, and sockets 12a and 12b of containment elbow fitting 12, is a pair of like alignment supports 30. Each of these alignment supports includes a peripheral flange 30a (FIG. 3). Preferably this flange is in the form of a triangle, having arcuate outer ends 30b, for engaging the interior periphery of sockets 12a and 12b in three places. The radius of this flange to the center of the support 30 is basically equal, i.e., comparable in size, to the radius of the inner periphery of sockets 12a and 12b. Flange 30a defines a central opening 30c having a diameter comparable to the outer diameter of carrier pipes 24 and the inner diameter of sockets 22a and 22b. Openings 30c are axially aligned with sockets 22a and 22b. Each support 30 also has an axially extending, integral sleeve 30d having an inner diameter comparable in size to the outer diameter of sockets 22a and 22b of carrier fitting 22.

The task of assembling the novel fitting subassembly 11 is simple, readily performed, and requires little labor and no subsequent leak testing. Specifically, carrier fitting 22 is inserted centrally inside containment fitting 12, before or after placing one of the supports 30 over one of the sockets 22a or 22b, with an adhesive therebetween to bond the two elements together. The one support 30 is inserted until it abuts one of the shoulders, e.g. 12d, of containment fitting 12, thereby centering the carrier fitting within the containment fitting. The second support 30 is then inserted in the other open end socket, e.g., 12a, of fitting 12, and slid over the outer surface of the second carrier fitting socket, e.g., 22a, being adhered thereto by adhesive applied to the internal surface of sleeve 30d and/or the exterior surface of socket 22a. The second support 30 is pressed into the fitting until it substantially abuts against shoulder 12c of socket 12a. The amount of adhesive used is small, creating only a tack-type attachment, preferably by having just spots of adhesive. The adherence need only be temporary to keep the components in position for handling, shipping and later assembly with pipes. The fitting subassembly is then ready to be shipped to an installer for subsequent assembly with appropriate carrier pipes 24 and containment pipes 14. No leak testing of the fitting subassembly is required since there are no connections where leakage might occur. Ultimately the installer can install the fitting and pipes simply by placing adhesive around the periphery of the ends of the container pipes 14, and/or within the sockets 12a and 12b, and slidably interconnecting them, and by placing adhesive around the ends of the periphery of carrier pipes 24 and/or the sockets 22a and 22b and slidably interconnecting them.

If the carrier pipes axially thermally expand during use, and create stresses at the fittings, flanges 30a of supports 30 are frangible polymer and can simply break to release the stress, or can bleak loose from the tacked carrier fitting sockets to relieve the stress, both without damage to the pipe system.

It is realized that the structure set forth is relatively simple. Indeed, the simplicity of the invention is one of its chief attributes in comparison to the complex and costly prior art. As noted previously, a variety of fittings can be substituted for the 90° elbow without departing from the invention! . Further, certain minor modifications of the preferred embodiment set forth as illustrative of the invention may be made by those skilled in the art to suit a particular situation. Hence, it is not intended that the invention be limited to the illustrated embodiment, but only by the scope of the appended claims and the reasonably equivalent structures to those defined therein.

The embodiments of the invention in which an exclusive property or privilege is claimed are defined as follows.

1. A containment pipe assembly comprising:
   at least one containment pipe;
   at least one carrier pipe;
   a containment fitting having open end sockets of a radius to slidingly receive ends of containment pipes, and having an inner axial shoulder;
   a carrier fitting having open end sockets of an inner radius to slidingly receive ends of carrier pipes;
   said carrier fitting being inside of and spaced from said containment fitting;
   a pair of alignment supports between respective ones of said containment fitting sockets and said carrier fitting sockets;
   each said support having a peripheral flange with a radius comparable in size to the radius of said containment fitting socket and fitted therewithin, and said flange abutting said containment fitting socket shoulder;
   said flange defining a central orifice having a diameter comparable in size to the outer diameter of a carrier pipe, and the inner diameter of said carrier fitting socket receiving the end of said carrier pipe;
   each said support also having an axially extending cylindrical sleeve with an inner diameter comparable in size to the outer diameter of said carrier socket; and
   said support sleeves being fitted over the respective ones of said carrier sockets.

2. The containment pipe assembly in claim 1 wherein said support sleeves are adhesively tacked to said carrier fitting sockets.

3. The containment pipe assembly in claim 2 wherein said support flanges are frangible.

4. A containment pipe fitting subassembly comprising:
   a containment fitting having open end sockets of a radius to slidingly receive ends of containment pipes;
   a carrier fitting having open end sockets of a radius to slidingly receive ends of carrier pipes, said carrier fitting being inside said containment fitting;
   a pair of alignment supports radially between respective ones of said containment fitting sockets and said carrier fitting sockets;
   each said support having a peripheral flange with a radius comparable in size to the radius of said containment fitting socket and fitted therewithin;
   said flange defining a central orifice having a diameter comparable in size to the inner diameter of said carrier fitting socket; and
   each said support also having an axially extending cylindrical sleeve with an inner diameter comparable in size to the outer diameter of said carrier socket and said sleeve being fitted over said carrier socket.

5. The containment pipe fitting subassembly in claim 4 wherein said support flanges are free from bonding to said containment fitting sockets.

6. The containment pipe fitting subassembly in claim 4 wherein said containment fitting sockets have annular shoulders, and said supports are at said shoulders.

7. The containment pipe fitting subassembly in claim 6 wherein said fittings and supports are polymeric, said support sleeves being bonded to said carrier fitting sockets, and said support flanges being unbonded to said shoulders.

8. A pair of alignment supports for fitting between containment fitting end sockets and carrier fitting end sockets of a containment pipe assembly;

each said support having a peripheral flange with a radius comparable in size to the inner radius of a containment fitting socket;

said flange defining a central orifice having a diameter comparable in size to the outer diameter of a carrier pipe and to the inner diameter of a carrier fitting socket; and each said support also having an axially extending cylindrical sleeve with an inner diameter comparable in size to the outer diameter of a carrier socket, said sleeve to be fitted over the carrier socket.

9. The alignment supports in claim 8 wherein each said support is polymeric and said flange is frangible.

* * * * *